Patented June 16, 1942

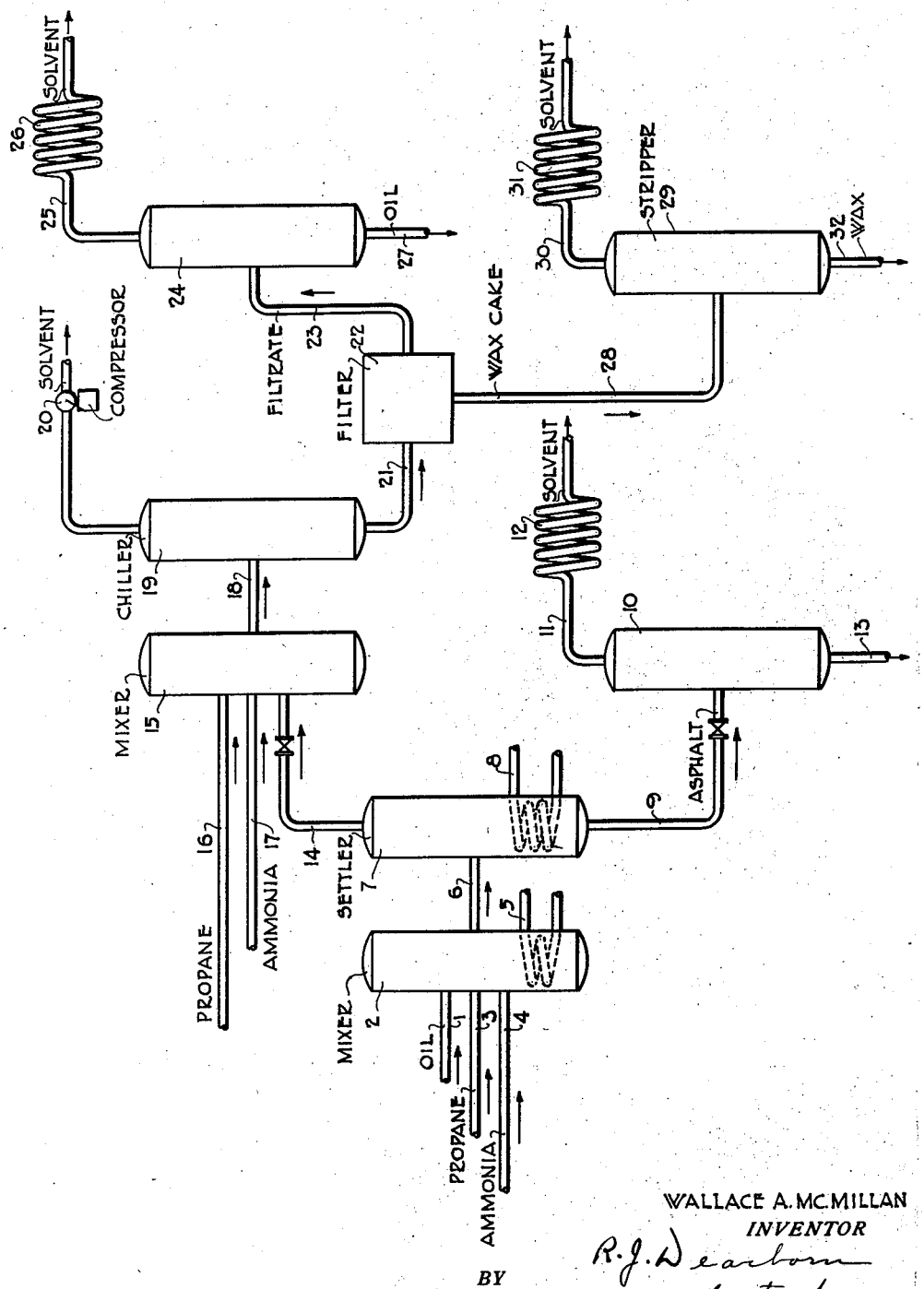

2,286,823

UNITED STATES PATENT OFFICE 2,286,823

SOLVENT DEASPHALTING AND DEWAXING

Wallace A. McMillan, Elmhurst, N. Y., assignor, by mesne assignments, to The Texas Company, New York, N. Y., a corporation of Delaware Continuation of application Serial No. 112,495, November 24, 1936. This application July 30, 1940, Serial No. 348,435

7 Claims. (Cl. 196—13)

This invention relates to a method of solvent refining mineral oil, and particularly a method of refining residual lubricating oil fractions derived from petroleum. The invention contemplates a method of removing asphaltic constituents from mineral lubricating oil by dilution of the oil with a light petroleum fraction, such as propane, wherein the asphaltic constituents are precipitated from the dilute mixture in the presence of anhydrous ammonia.

I have discovered that a mixture of a light petroleum hydrocarbon and anhydrous ammonia provides a very efficient mixture for precipitating asphaltic constituents and sludge bodies from mineral lubricating oil. The presence of the ammonia is beneficial in increasing the amount of undesired constitutents precipitated from the dilute mixture.

It has been found that a small amount of anhydrous ammonia, namely, about 10% by volume of the mixture of oil and diluent, very greatly increases the amount of asphaltic material precipitated.

The invention is applicable to the treatment of wax-bearing mineral lubricating oil fractions, and in which case advantage is taken of the anti-solvent action of ammonia upon the wax constituents of the oil in order to facilitate the subsequent dewaxing step.

In practicing the invention as applied to the treatment of a wax-bearing residual fraction, the oil is mixed with a light petroleum hydrocarbon, such as propane, in the proportion of about one part of oil to four to six parts of light hydrocarbon. Liquid anhydrous ammonia is incorporated in the mixture to the extent of about 10% by volume of the dilute mixture. The resulting mixture, maintained under pressure sufficient to prevent vaporization of the diluent and ammonia, is then settled at around room temperature, or if desired at slightly higher temperatures in the range from about 70° to 125° F.

Under these conditions, the asphaltic constituents are precipitated from the oil. The precipitated material is withdrawn and the solvent recovered therefrom by stripping.

The remaining solution comprising wax-bearing oil, propane and ammonia, is withdrawn and chilled to a temperature of 0° F. or below in order to precipitate the wax constitutents. Chilling may be effected by bringing the solution into indirect heat exchange relationship with a cold refrigerating liquid body in the conventional manner. On the other hand, the chilling may be effected by vaporization of a portion of the diluent liquid.

Where this method is pursued, it is necessary, of course, to incorporate additional diluent liquid and ammonia in the mixture being chilled so that upon cooling to the desired low temperature, the wax-bearing oil will be mixed with sufficient diluent liquid to permit satisfactory separation of the precipitated wax from the chilled mixture.

The ammonia acts as a wax anti-solvent, and, therefore, improves the selective action of the mixture as between oil and wax at the dewaxing temperature. The use of ammonia in conjunction with propane provides an additional advantage when evaporative cooling is employed. It is found thart propane-ammonia forms a constant boiling mixture consisting of approximately 66.3% of propane and 33.7% of ammonia, at a temperature of —62° F. at atmospheric pressure. Propane boils at —44° F. at atmospheric pressure. Consequently, by the use of the propane-ammonia mixture, a lower chilling temperature can be readily attained by evaporative cooling at atmospheric pressure, thereby eliminating the necessity for the use of vacuum producing equipment as well as the necessity for constructing the chilling equipment and tankage to withstand subatmospheric pressures, as is required in a system employing propane designed to provide very low chilling temperatures.

The chilled mixture containing the precipitated wax is then filtered to remove the wax. The solvent is then stripped from the resulting filtrate and recovered for reuse leaving a lubricating oil from which both the asphaltic and wax constituents have been removed.

Other means of wax separation may be employed, as, for example, settling and centrifugal separation.

In order to illustrate the method of carrying out the process of this invention, reference will now be made to the accompanying drawing, which represents, in diagrammatic side elevation; one form of apparatus suitable for carrying out the process.

Referring to the drawing, a wax bearing oil is conducted from a source not shown through a pipe 1 to a mixer 2. A liquefied normally gaseous diluent, such as propane, is also conducted through a pipe 3 from a source not shown to the mixer 2. Likewise, a small amount of liquid anhydrous ammonia is conduceted from a source not shown through a pipe 4 to the mixer 2.

The mixer is advantageously provided with a heating coil 5 by which means the mixture of oil, propane and ammonia is raised to the desired temperature.

The resulting mixture at a suitable temperature is then conducted through a pipe 6 to a settler 7. The settler 7 is advantageously provided with a heating coil 8 for the purpose of maintaining the mixture at the desired temperature during settling.

As a result of the settling operation, asphalt is precipitated as a lower layer which is withdrawn from the settler through a pipe 9. The withdrawn asphalt is conducted to a stripper 10 wherein the solvent is stripped and removed through a pipe 11 and cooling coil 12. The asphalt substantially free from solvent is withdrawn from the bottom of the stripper through a pipe 13.

The upper layer accumulating in the settler 7 comprising deasphalted wax-bearing oil dissolved in a relatively large body of solvent mixture is conducted through a pipe 14 to a mixer 15 wherein it may be mixed with additional quantities of propane and ammonia introduced through pipes 16 and 17, respectively.

The resulting mixture is conducted from the mixer 15 through a pipe 18 to a chiller 19 advantageously of the evaporative type.

Surplus solvent liquid comprising propane and ammonia is evaporated from the mixture within the chiller with refrigerative effect, the evaporated solvent being withdrawn through a compressor 20.

The resulting chilled mixture is drawn off from the bottom of the chiller through a pipe 21 to a filter 22 wherein the solidified wax is removed from the chilled mixture as a filter cake of wax, while a dewaxed filtrate is produced.

The dewaxed filtrate is conducted through pipe 23 to a stripper 24 wherein the solvent is vaporized and removed from the dewaxed oil, the solvent being discharged through a pipe 25 and cooling coil 26, while the solvent free oil is discharged through a pipe 27.

The wax filter cake is conducted through a pipe 28 from the filter to a stripper 29 wherein the solvent is evaporated and removed. The evaporated solvent is discharged through a pipe 30 and cooling coil 31, while the solvent free wax is discharged through a pipe 32.

The solvent mixture of my invention is also useful in removing sludge bodies and asphaltic constituents from used lubricating oils. For example, a lubricating oil which had been used for the lubrication of internal combustion engines was mixed with propane in the proportion of about one part of oil to four parts of propane. About 9% or 10% of liquid anhydrous ammonia was incorporated in the mixture, and the resulting mixture allowed to stand at normal room temperature.

Under these conditions, a substantial amount of sludge was precipitated from the oil. The volume of sludge so precipitated was found to be about 9% greater than that precipitated from a similar sample of the same oil when using the same volume of propane in the absence of anhydrous ammonia.

The sludge material separated had a pronounced greenish cast as contrasted with a dark red cast in the case of the sludge separated from the comparative sample in the absence of ammonia.

When the ammonia is used as a component of the solvent mixture, the neutralization number of the oil is reduced from 1.23 to 0.92, thus indicating a neutralizing effect, or possibly the removal of acidic bodies.

While certain solvent proportions and treating temperatures have been mentioned above, it is contemplated that these conditions may be varied, depending upon the nature of the oil undergoing treatment as well as upon the degree of refining action desired.

While propane has been described above as a suitable diluent, it is contemplated employing other light petroleum fractions comprising normally gaseous hydrocarbons as, for example, ethane, propane, butane, pentane, or mixtures comprising two or more of these light hydrocarbons.

This application is a continuation of my pending application Serial No. 112,495, filed November 24, 1936, Solvent deasphalting and dewaxing.

Obviously many modifications and variations of the invention, as hereinbefore set forth, may be made without departing from the spirit and scope thereof, and therefore only such limitations should be imposed as are indicated in the appended claims.

I claim:

1. The method of deasphalting a mineral lubricating oil which comprises diluting the oil with about 4–6 parts of a liquefied normally gaseous petroleum hydrocarbon to 1 part of the oil, and with a small proportion of anhydrous liquid ammonia of the order of about 10% by volume of the dilute mixture and such that upon subjecting the mixture to settling at about 70 to 125° F., the volume of non-paraffinic material precipitated is substantially greater than that precipitated in the absence of the ammonia, settling the mixture under pressure sufficient to prevent vaporization of the diluent and ammonia during settling and at temperatures of about 70–125° F. to precipitate asphaltic constituents from the oil-solvent solution containing the bulk of the paraffinic and naphthenic constituents of the oil, separating the asphaltic constituents so precipitated from the oil-solvent solution, and recovering the solvent from the deasphalted oil.

2. The method of deasphalting and dewaxing a mineral lubricating oil which comprises diluting the oil with about 4–6 parts of propane to 1 part of oil and with a small proportion of anhydrous liquid ammonia of the order of about 10% by volume of the dilute mixture and such that upon subjecting the mixture to settling at about 70 to 125° F., the volume of non-paraffinic material precipitated is substantially greater than that precipitated in the absence of the ammonia, settling the mixture under pressure sufficient to prevent vaporization of the diluent and ammonia during settling and at temperatures of about 70–125° F. to precipitate asphaltic constituents from the oil-solvent solution containing the bulk of the paraffinic and naphthenic constituents of the oil, separating the asphaltic constituents so precipitated from the oil-solvent solution, chilling the separated oil-solvent solution to a temperature substantially below 0° F. to precipitate wax by evaporation of a constant boiling mixture of propane and ammonia at substantially atmospheric pressure or slightly above, separating the precipitated wax from the chilled oil-solvent solution, and recovering the solvent from the deasphalted and dewaxed oil.

3. The method of deasphalting mineral lubricating oil containing sludge bodies and asphaltic constituents which comprises diluting the oil with a liquefied normally gaseous petroleum fraction comprising propane, incorporating therein a relatively small proportion of anhydrous liquid ammonia such that upon subjecting the mixture to settling at a temperature of about 70 to 125° F., the volume of sludge precipitated is about 9% greater than that precipitated in the absence of the ammonia, and the remaining oil after removal of the solvent is of better color than that obtained, in the absence of the ammonia, subjecting the mixture to settling at said temperature and under pressure sufficient to prevent vaporization of the diluent and ammonia during settling to precipitate asphaltic and sludge bodies, and removing the material so precipitated.

4. The method of deasphalting a mineral lubricating oil which comprises diluting the oil with liquid propane, incorporating therein a small proportion of anhydrous liquid ammonia of the order of about 10% by volume of the dilute mixture and such that upon subjecting the mixture to settling at about 70 to 125° F., the volume of non-paraffinic material precipitated is substantially greater than that precipitated in the absence of the ammonia, settling the mixture under pressure sufficient to prevent vaporization of the diluent and ammonia during settling and at temperatures of about 70 to 125° F. to precipitate asphaltic constituents from the oil-solvent solution containing the bulk of the paraffinic and naphthenic constituents of the oil, separating the asphaltic constituents so precipitated from the oil-solvent solution, and recovering the solvent from the deasphalted oil.

5. The method of deasphalting and dewaxing a mineral lubricating oil which comprises diluting the oil with a liquefied normally gaseous petroleum hydrocarbon and with a small proportion of anhydrous liquid ammonia of the order of about 10% by volume of the dilute mixture and such that upon subjecting the mixture to settling at about 70 to 125° F., the volume of non-paraffinic material precipitated is substantially greater than that precipitated in the absence of the ammonia, settling the mixture under pressure sufficient to prevent vaporization of the diluent and ammonia during settling and at temperatures of about 70 to 125° F. to precipitate asphaltic constituents from the oil-solvent solution containing the bulk of the paraffinic and naphthenic constituents of the oil, separating the asphaltic constituents so precipitated from the oil-solvent solution, chilling the separated oil-solvent solution to a temperature substantially below zero degrees F. to precipitate wax by evaporation of a constant boiling mixture of propane and ammonia at substantially atmospheric pressure or slightly above, separating the precipitated wax from the chilled oil-solvent solution, and recovering the solvent from the deasphalted and dewaxed oil.

6. The method of deasphalting mineral lubricating oil containing sludge bodies and asphaltic constituents which comprises diluting the oil with a liquefied normally gaseous petroleum hydrocarbon, incorporating therein a relatively small proportion of anhydrous liquid ammonia such that upon subjecting the mixture to settling at a temperature of about 70 to 125° F., the volume of sludge precipitated is about 9% greater than that precipitated in the absence of the ammonia, and the remaining oil after removal of the solvent is of better color than that obtained, in the absence of the ammonia, subjecting the mixture to settling at said temperature and under pressure sufficient to prevent vaporization of the diluent and ammonia during settling to precipitate asphaltic and sludge bodies, and removing the material so precipitated.

7. In the treatment of a wax-bearing mineral lubricating oil wherein the wax-bearing oil is diluted with a liquefied normally gaseous petroleum hydrocarbon comprising propane and a small proportion of anhydrous liquid ammonia, the dilute mixture chilled to a temperature substantially below zero degrees F. to precipitate the wax; the method of effecting said chilling which consists in evaporating with refrigerative effect from the dilute mixture a constant boiling mixture consisting of approximately two parts propane and one part ammonia at substantially atmospheric pressure such that upon continued evaporation of said constant boiling mixture the dilute wax-bearing mixture can be cooled to a temperature substantially below minus 44° F.

WALLACE A. McMILLAN.